July 5, 1932. F. H. OWENS 1,866,268
MEANS FOR TITLING SOUND FILM RECORDS
Filed July 13, 1927

INVENTOR.
FREEMAN H. OWENS.
BY John B. Brady
ATTORNEY

Patented July 5, 1932

1,866,268

UNITED STATES PATENT OFFICE

FREEMAN H. OWENS, OF NEW YORK, N. Y.

MEANS FOR TITLING SOUND FILM RECORDS

Application filed July 13, 1927. Serial No. 205,446.

In the art of photographing sound on a strip of film for reproduction, it has heretofore been necessary either to attach a title strip to the strip of film to indicate the title of the sound record or to play or reproduce the sound record to determine its title. By my invention, I have provided a means for permanently indicating on the film sound record, the title thereof and this forms the primary object of my invention.

Another object lies in the provision of certain novel means for printing such title on the sound record.

Other objects and advantages in details of construction and operation will be apparent as the description proceeds, reference now being had to the figures of the drawing wherein like reference numerals indicate like parts.

Figure 1:
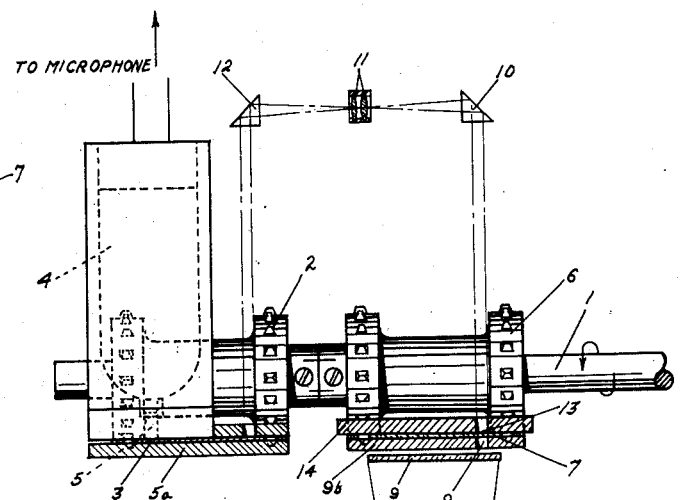
Figure 1 is a top plan view of an apparatus for carrying out the above mentioned purpose.
Figure 2:
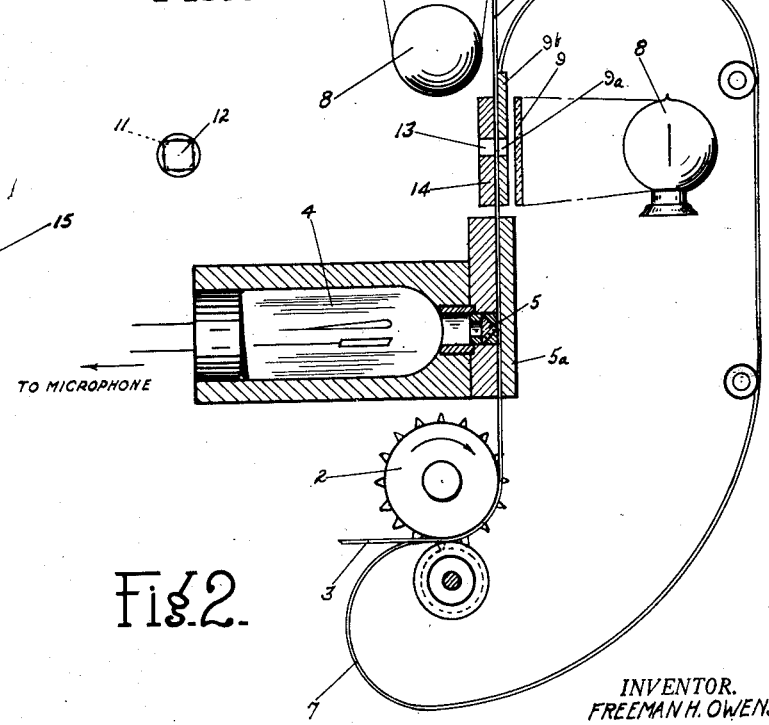
Figure 2 illustrates diagrammatically and partly in sectional elevation, the apparatus shown in Figure 1.

With reference now to Figure 1, the reference numeral 1 indicates a shaft which carries a sprocket 2 over which passes a strip of film 3 upon which is to be photographed a sound record by means of a recording lamp indicated at 4, the modulated light rays of which pass through an optical slit member 5 past which and in engagement with which the photographic film 3 is moved by the sprocket 2. A film gate 5a of any suitable construction holds the film 3 in engagement with the slit member 5.

Mounted on the same shaft 1 is a second sprocket 6 adapted to move the second strip of photographic film 7 preferably in the form of an endless loop and bearing thereon the printed title of the sound record being recorded on the film 3.

A lamp 8 of constant intensity is mounted on one side of the endless film and the rays from this lamp, diffused by a ground glass or screen 9, pass through an aperture 9a in a film gate 9b, then through the film 7, and project the title thereon through the aperture 13 in a second film gate or guide 14, to a prism or mirror 10 which reflects the image of the title at right angles, through the lens 11 where the image is caught by a second prism or mirror 12 and again turned at right angles and projected to the same side of the photographic film 3, which receives the image of the title along side of the photographic record being recorded.

Of course, the printed title may appear as many times as desired on the endless negative title film 7 so that the title is printed on the sound film 3 practically continuously or at spaced intervals as desired.

Figure 3:
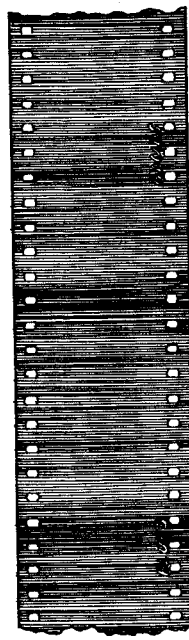
Figure 3 is a section of title film.
Figure 4:
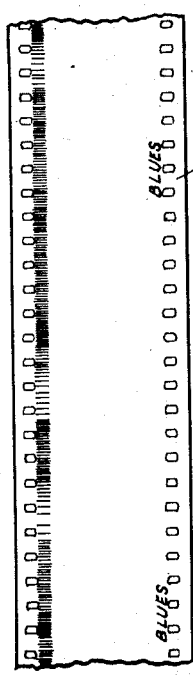
Figure 4 is a section of film bearing the sound record and the title thereof.

In Figure 3, there is shown a section of the endless negative film 7, carrying the printed title. In Figure 4, there is shown a section 15 of film, after having been printed with the title and the sound record recorded thereon and developed to bring out the images.

Of course, many changes may be made in details of construction and operation without departing from the spirit and scope of my invention. I do not limit myself, therefore, to the form shown and described other than by the appended claims.

I claim:—

1. In combination, a film, means for recording a sound record thereon, a second film bearing a title, means for simultaneously and continuously moving said films in adjacent paths substantially separated from one another, and means for titling the sound recording film with said title at predetermined spaced intervals simultaneously with the recording of a sound record thereon.

2. In combination, a film, means for recording a sound record thereon, a title film, means for simultaneously and continuously moving said films in independent separated paths, an optical system intermediate said films, and means for titling said sound recording film through said optical system at predetermined spaced intervals.

3. In combination, a shaft, a sprocket thereon, a film movable by said sprocket, means for recording a sound record thereon, a second sprocket on said shaft substantially removed from the first sprocket a second film bearing a title and movable by said second sprocket, an optical system intermediate said films, and means for projecting said title from said title film through said optical system to said first named film whereby said title and sound record may be simultaneously printed and recorded on said first named film.

4. In combination, a shaft, a sprocket thereon, a film movable by said sprocket, a slit member past which said film moves, a recording lamp co-operating with said slit and recording a sound record on said film, a second sprocket on said shaft substantially removed from said first sprocket, a second film bearing a title and movable by said second sprocket, a member with an aperture past which said second film moves, a series of lenses between said films, a projecting lamp co-operating with said aperture for projecting said title through said series of lenses, whereby said title is printed on the said first named film simultaneously with the recording of the sound record on said first named film.

5. Apparatus for sound recording and printing of titles appropriate to a sound record comprising a sensitized sound record film, a sound recording camera actuated by electrical impulses, a record film bearing titular records appropriate to the sound to be recorded, an optical system interposed between said films for transferring the records from one to the other of said films, and actuating means comprising a pair of sprockets mounted on a common drive shaft, each sprocket being adapted to move one of said films continuously and in synchronism with the other for printing said titular records on said sound record film simultaneously with the photographing of the sound record.

FREEMAN H. OWENS.